Aug. 9, 1949.  C. D. WILCOX  2,478,516
COLLAPSIBLE BABY WALKER
Filed Dec. 28, 1945  2 Sheets-Sheet 1
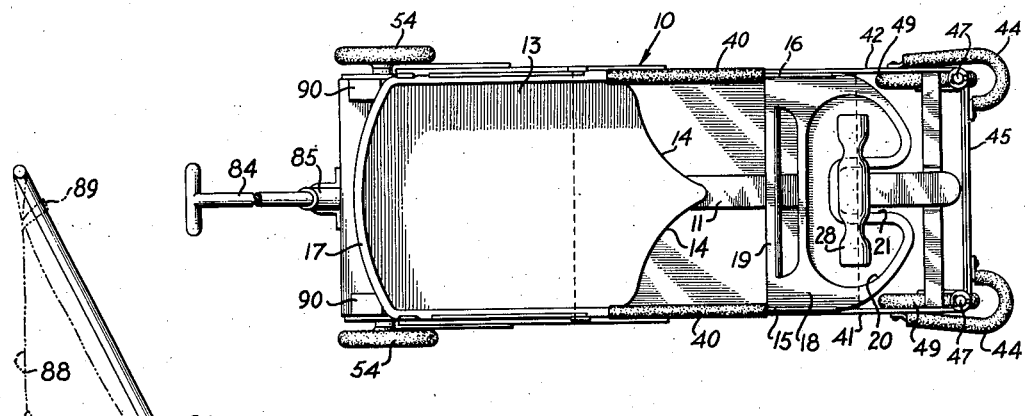
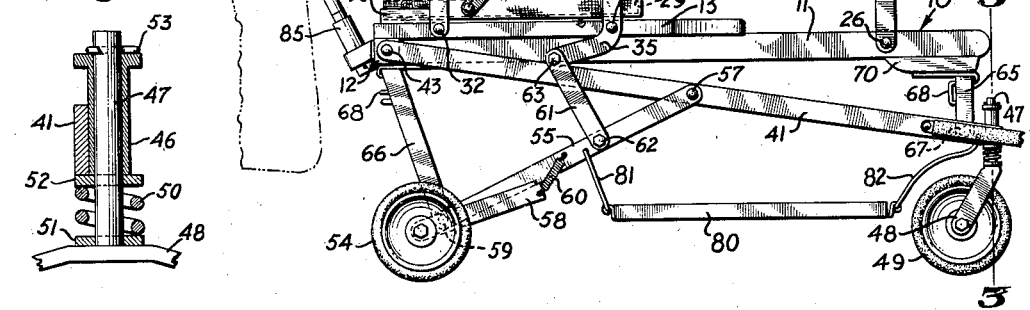
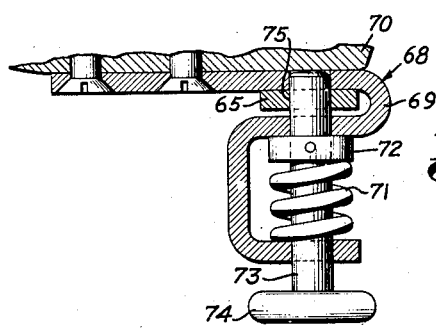
INVENTOR.
CHARLES D. WILCOX.
BY
ATTORNEY.

Aug. 9, 1949.   C. D. WILCOX   2,478,516
COLLAPSIBLE BABY WALKER
Filed Dec. 28, 1945   2 Sheets-Sheet 2
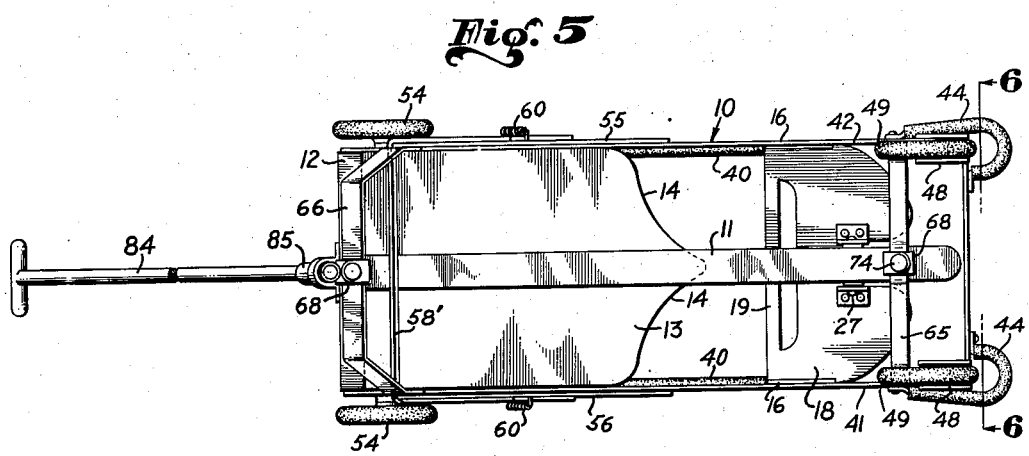
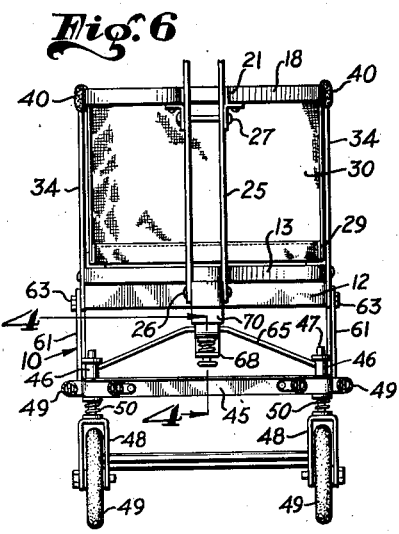
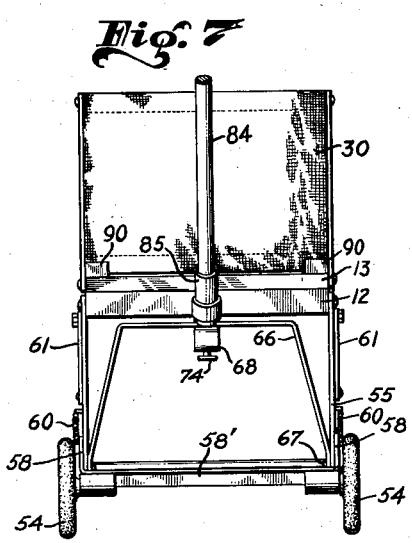
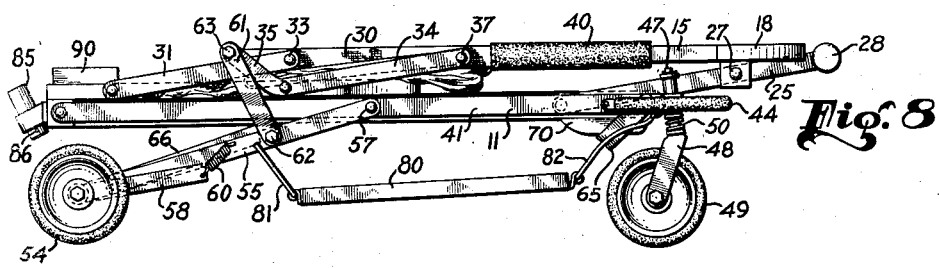
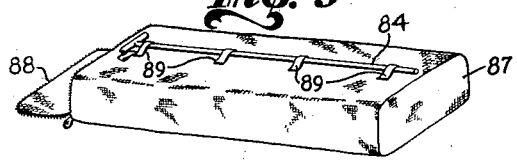
INVENTOR.
CHARLES D. WILCOX.
BY
ATTORNEY.

Patented Aug. 9, 1949

2,478,516

UNITED STATES PATENT OFFICE 2,478,516

COLLAPSIBLE BABY WALKER

Charles D. Wilcox, Hemet, Calif.

Application December 28, 1945, Serial No. 637,643

7 Claims. (Cl. 280—41)

The invention relates to collapsible wheeled vehicles and has particular reference to a conveyance commonly known as a baby walker in which small children are pushed about or in which small children may push themselves about.

Although collapsible features have long been used on baby carriages and although baby walkers of a variety of types have been in vogue for a considerable time, baby walkers or baby carts in which collapsible features have been attempted have failed to produce a safe, simple and at the same time rugged vehicle which is satisfactory for all purposes and which may be used without fear of injuring the child due to accidental collapse.

Among the objects of the invention is to provide a new and improved collapsible baby walker or baby cart which is so constructed that the child rides at a sufficient height above the ground to afford ample leg room and which is sufficiently commodious to permit the child freedom to move about and without the danger of falling out of the vehicle.

Another object of the invention is to provide a collapsible baby walker which is rigid and safe in extended position and which can be collapsed compactly with the several parts lying one against the other to make a package which can be readily stowed away in a small space or suitable bag for convenient transportation.

Still another object is to provide a baby walker in which both a body supporting framework above a chassis and a wheel supporting framework below the chassis may be folded into a collapsed position against the chassis for storage or transportation.

It is also an object to provide novel spring mountings for the wheels which will improve the riding qualities without adding unnecessarily to the number of parts.

Still further among the objects is to provide a collapsible type baby walker or cart in which the collapsing parts are so constructed that they cannot pinch or injure the occupant and which is further provided with simple accessories such as handle bars, a removable handle and a removable foot rest, all of which can be folded into a compact package whenever the vehicle is collapsed. Safety features incorporated in the vehicle include temporary locking devices which cannot be accidentally unlocked.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a top view of the vehicle in extended position.

Figure 2 is a side elevational view of the vehicle in extended position.

Figure 3 is a fragmentary, sectional view taken on the line 3—3 of Figure 2 showing the front wheel support.

Figure 4 is a fragmentary, sectional view taken on the line 4—4 of Figure 6 showing one of the locking devices.

Figure 5 is a bottom view of the device in extended position.

Figures 6 and 7 are front end and rear end views respectively.

Figure 8 is a side elevational view of the device in collapsed position.

Figure 9 is a view of a canvas bag adapted to hold the collapsed vehicle.

In the design and construction of vehicles in the nature of baby walkers and baby carts several factors must be given prominence if the vehicles are to be completely successful. In the first place, safety features are of primary importance. The vehicles must be so constructed that they will not tip over and so that even though failing to tip over children cannot easily fall out of them. When they are to be of collapsible construction, the moving parts must be so arranged that there will be no likelihood of the device pinching and injuring the child should it collapse while the child is in it.

Another essential is to provide a device of such design that it can be collapsed into a compact arrangement which can be conveniently stored away in a small space such, for example, as the trunk compartment of an automobile, or arranged to be carried by hand should the need arise.

It is commonly known, also, that vehicles of this kind are used for children during a fast growing stage of their development, and to make it possible to use the device for a child of walking age as well as for a small child or baby some parts of the device must be either removable or be capable of being changed about to provide more room. The vehicle should be not only one which can be altered conveniently so as to fit the child's requirements as it grows but also one capable of being changed at any time should a child of different size have occasion to use it.

In an embodiment chosen to illustrate the invention there is shown an elongated chassis or body 10 comprising a frame having a central element or beam 11 which extends from the front to the rear of the vehicle. At the rear of the central element is a transverse frame element 12 located beneath and supporting a seat 13. It will be noted that the seat extends only part way forward from the rear of the vehicle and is provided with curved portions 14 to afford comfortable leg space for the occupant.

Above the chassis is provided a collapsible body supporting structure which includes a substantially horizontal encircling frame having side elements 15 and 16 joined at the rear by an element 17 and attached at the front to a tray 18. The tray is of special design and provides a hand rail 19 at the rear extending from side to side, a dished portion 20 in front of the hand rail and a deep recess 21 at the front of the dished portion.

For collapsibly mounting the body supporting structure there is provided a handle bar member 25 which has a pivot support 26 at the bottom adjacent the forward end of the central frame element 11 and a corresponding pivot support 27 at the bottom of the tray. The handle bar member extends upwardly through the recess 21 in the tray and has a cross-piece 28 at the top providing a hand hold. As indicated, the handle bar member actually consists of parallel side elements, one located on each side of the central frame element, the handle bar member serving as a forward stiffening element.

At the rear of the body supporting member is a somewhat U-shaped bracket 29. The bracket provides a support for the bottom edge of a sheet 30 of canvas or similar material which at its upper edge is secured to the encircling frame. Stiffeners 31 and 34 hold the encircling frame in erect position as shown in Figure 2. The rear vertical stiffeners 31 are pivotally supported at the points 32 to the seat 13 and at the upper ends at the points 33 to the encircling frame. Intermediate stiffeners 34, provided with angular extensions 35 at the bottom, are supported at the points 36 upon the seat and at the points 37 upon the encircling frame. Diagonal stiffeners 38 are pivotally attached at their bottom ends by pins 39 to the U-shaped bracket 29 and at their top ends are pivotally secured at the points 37 which likewise support the intermediate stiffeners. Padded arm rests 40 may be provided on the encircling frame rearwardly of the tray.

A collapsible support for four wheels upon which the vehicle rides is provided on the underside of the chassis. The collapsible support consists of parallel side rails 41 and 42 which have pivotal attachments 43 at the ends of the rear frame element 12 and extend diagonally downwardly beneath and toward the front of the vehicle. At the front ends of the side rails are bumpers 44, the side rails being joined at their front ends by a cross-piece 45 to which bumpers are likewise attached. At each front corner where the cross-piece joins the side rail is a wheel support comprising a bushing 46 fixed to the side rail and cross-piece within which a vertical shaft 47 is adapted to be reciprocably mounted. The bottom end of the shaft is attached to a fork 48 which extends downwardly to support a wheel 49.

To provide a spring cushion between the front wheels and the vehicle each wheel mounting includes a coiled spring 50 which acts between spring keepers 51 and 52 respectively adjacent the fork and the bushing. A cotter pin 53 prevents the shaft from sliding out of the bushing. The fork and shaft of the front wheels permit them to pivot so that the vehicle may be more easily steered.

For mounting the rear wheels 54 there are provided rearwardly extending links 55 and 56 having pivot connections 57 respectively at their forward ends to the side rails. It will be noted that the pivot connections are located intermediate the ends of the side rails at approximately the mid-point. At the lower end of each rearwardly extending link is a spring link 58 which is pivotally supported at the point 59 upon the lowermost end of the link 55. Rigidity is improved by joining the outer ends of the spring link by a cross brace 58'. The wheel 54 in each case is mounted individually upon an end of the spring link at one side of the pivot point and a spring 60, attached to the link 55, retains the opposite end of the spring link. The spring 60 provides a cushion for the rear wheel in each case.

One feature of importance is incorporated in a connecting link 61 on each side pivotally secured at the lower end 62 to the link 55 intermediate its ends and having a pivot connection 63 to the angular extension 35 of the stiffener 34.

To lock both the collapsible wheel support and the collapsible body supporting member in extended positions there are provided a front bracket 65 and a rear bracket 66. The front bracket 65, having somewhat the shape of a shallow V as best viewed in Figure 6, has its free ends extending downwardly to pivot connections 67 located one on each side at the front end of the respective side rail. In extended position wherein the bracket is vertically disposed it is adapted to be locked in by means of a locking device 68, details of which are shown in Figure 4. The locking device consists of a strip 69 bent approximately into an S shape, the upper end of which may be bolted to a block 70 at the forward end of the frame element 11. One loop of the S is adapted to receive a coiled spring 71 which presses at one end against the strip and at the other end against a collar 72 fixed to bolt 73 for pressing the bolt into locked position. The bolt extends slidably through apertures in the loops of the S, as illustrated, and has a knob 74 at the lower end to provide a hand hold. The upper portion of the bracket 65 at its point of engagement with the loop is provided with an aperture 75 adapted to receive the bolt by means of which the bracket is locked in extended position.

For holding the rear wheels in extended position the bracket 66 is adapted to be locked by the rearward locking device 68. So that the mid-portion of the bracket may fit snugly within the locking device it is bent at an angle transversely so that the mid-portion in extended position lies substantially flat against the bottom of the rear element 12 of the frame. The bracket 66 is locked in place by the same type of locking device shown in Figure 4 as was described for the front bracket 65.

A removable foot rest 80 is shown suspended by a rearward sling 81, the ends of which loosely engage the rearwardly extending links 55, and a forward sling 82, the ends of which engage the forwardmost ends of the side rails 41. By forming the slings in a substantially U shape with the legs of the U turned in slightly for engagement, respectively, with the links and rails the foot rest may be readily removed by springing the slings outwardly from their respective engaged positions.

Of equal convenience is the provision of a removable handle 84 which is adapted to be retained in a socket 85 located at the rear of the chassis. The bottom end of the handle may be provided with a pimple or protrusion 86 or some similarly appropriate device which will hold the handle in the socket but with sufficient looseness to permit ready removal when the handle is pulled endwise.

Another feature is incorporated in a carrying bag or sack 87 having a closure 88 and provided with straps 89 by means of which it can be slung upon the handle and utilized as a shopping bag. When the handle and bag have been removed and the vehicle collapsed, the bag may be used as a cover and carrying case for the vehicle with the handle secured by the straps to the outside as shown in Figure 9.

Normally the vehicle will be used in extended position as shown in Figures 1 through 7 inclusive. In this position the rails 41, 42 and links 55, 56 will be held in their most extended position downwardly by the brackets 65 and 66 respectively. The tops of the brackets will be locked by the locking devices 68. When the links 55 are in extended position, the connecting link 61 being in engagement with the angular extension 35 will draw the extension in a downward direction causing the stiffeners 34 to rotate into their uppermost or vertical position. Rotation of the stiffeners to their vertical position effects a raising of the encircling frame 15 to its uppermost position in which the stiffeners 31 and the handle bar member 25 will likewise be erect. At the same time the diagonal braces 38 will be pushed rearwardly to the position shown in Figure 2 wherein they will tend to force the U-shaped bracket 29 rearwardly until it presses against a pair of blocks 90. Cooperation between the diagonal braces and the blocks, together with the remaining elements which comprise the body supporting structure, tends to stiffen the structure in erect position and thereby provide a safe and secure support for the body of the child.

When the device is to be collapsed, the rear bracket 66 may be unlocked and moved to a position between the links 55, 56. At the same time the bracket 65 may be disengaged from the locking device and rotated to a position between the rails 41, 42. With the bracket supports thus removed the links 55, 56 and side rails 41, 42 may be pressed against the chassis. Movement in this manner will tend, through the connecting links 61, to rotate the vertical stiffeners 34 to the position shown in Figure 8. The effect of this will be to collapse the body supporting structure likewise into the position shown in Figure 8. It will be apparent from this that the locking devices 68 for the front and rear brackets serve the double purpose of locking both the wheel supporting structure and the body supporting structure in erect position. By the same token release of the locking members permits both collapsible portions of the device to be contracted at the same time into the compact arrangement shown in Figure 8.

The vehicle may be wheeled about in collapsed position if desired. If not, the handle may be removed and the vehicle inserted within the sack and made up into the compact carrying arrangement shown in Figure 9.

The arrangement just described provides a vehicle for wheeling children about which is of rugged construction and which is specially provided with handy and convenient means for extending the entire vehicle into an erect position ready for use but which by the simple expedient of releasing two locking devices permits the entire vehicle to be collapsed into a compact arrangement occupying substantially a minimum amount of space so that it may be readily and conveniently carried about or, if preferred, stored away into a small place. Further, by removing the foot rest and handle the vehicle may be converted into a self-propelled walker which a child can push about by himself.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. A wheeled vehicle comprising an elongated chassis incorporating a frame having a center beam, a transverse element at the rear and a seat adjacent the rear of said frame, a collapsible body supporting structure above the chassis comprising a horizontal encircling frame spaced from the chassis, vertical stiffeners having pivot connections at opposite ends respectively to the said encircling frame and the chassis, said structure including a flexible back rest and diagonal stiffening braces between upper and lower edges of the back rest, a tray at the forward end of the encircling frame and a bar member having pivotal connections respectively to the tray and the chassis, a collapsible wheel support comprising a pair of side rails having rear ends pivotally secured to the rear of the chassis and in extended position extending diagonally downward toward the front of the chassis, swivelly mounted wheels on front ends of the rails, a pair of links extending diagonally rearward from the mid-portions of the rails and pivotally attached thereto, wheel supporting spring links on the lower ends of the first links and rear wheels thereon, collapsible supporting brackets respectively at the front ends of the rails and rear ends of said first links having a releasable engagement with the chassis in extended position, vertical stiffeners on opposite sides of the body supporting structure having angle extensions below the chassis and pivotally secured connecting links between the angle extensions and an intermediate portion of the rearwardly extending links.

2. A wheeled vehicle for children comprising an elongated chassis incorporating a frame having a center beam, a transverse element at the rear and a seat supported on the beam adjacent the rear of said frame, a collapsible body supporting structure above the chassis comprising a horizontal encircling frame spaced from the chassis, rear and intermediate vertical stiffeners having pivot connections at opposite ends respectively to the encircling frame and the chassis, said structure including a flexible back rest secured at one edge to the encircling frame and having a free swinging reinforced bottom edge above the seat, diagonal stiffening braces between the upper and lower edges of said back rest, a tray at the forward end of the encircling frame having a front recess, and a handle bar member for additional stiffening comprising parallel elements extending from a position above the tray through the recess therein to the chassis and pivotal connections to the tray and the chassis, a collapsible four wheel supporting structure comprising a pair of side rails having rear ends pivotally secured to the rear of the chassis and in extended position extending diagonally downward toward the front of the chassis, bumpers and spring cushioned, swivelly mounted wheels on front ends of the rails, a pair of links extending diagonally rearward from the mid-portions of the rails and pivotally attached thereto, wheel supporting spring links on the lower ends of the first links joined at the lower ends and rear wheels thereon, collapsible supporting brackets respectively at the front ends of the rails and rear ends of said first links having a releasable engagement with the chassis in extended position, said intermediate vertical stiffeners having angle extensions below the chassis and pivotally secured connecting links between the angle extensions and an intermediate portion of the rearwardly extending links, a push handle removably supported in an upwardly rearwardly extending direction at the rear of the chassis and a removable foot rest supported by free swinging removable slings respectively on the rearward extending links and the side rails.

3. A wheeled vehicle comprising an elongated chassis incorporating a frame, a seat adjacent the rear of said frame, a collapsible body supporting structure above the chassis including supporting vertical stiffeners for the structure having pivot connections at opposite ends respectively to the structure and the chassis, a collapsible wheel support comprising a pair of side rails having rear ends pivotally secured to one end of the chassis and in extended position extending downwardly toward the opposite end, swivelly mounted wheels on lower ends of the rails, a pair of links having free ends extending in an opposite direction from intermediate portions of the rails and pivotally attached thereto, and wheels at the free ends of said links, collapsible supporting brackets respectively at the lower ends of the rails and the free ends of the links having a releasable engagement with the chassis in extended position, and connecting links pivotally secured respectively to portions of said vertical stiffeners on opposite sides of the body supporting structure and intermediate portions of said first links.

4. A wheeled vehicle comprising an elongated chassis incorporating a frame having a center beam, a transverse element at the rear, a seat adjacent the rear of said frame, a collapsible body supporting structure above the chassis incorporating supporting vertical stiffeners for the structure having pivot connections at opposite ends respectively to the structure and the chassis, a collapsible wheel support comprising a pair of side rails having ends pivotally secured to one end of the chassis and in extended position extending downward toward the opposite end, swivelly mounted wheels on the lower ends of the rails, a pair of links having free ends extending diagonally in an opposite direction from intermediate portions of the rails and pivotally attached thereto, wheel supporting spring links on the free ends of the first links and wheels thereon, collapsible supporting brackets respectively at the free ends of the rails and free ends of the first links having a releasable engagement with the chassis in extended position, said vertical stiffeners on opposite sides of the body supporting structure having extensions thereon and pivotally secured connecting links between the extensions and intermediate portions of the said first links.

5. A wheeled vehicle comprising an elongated chassis incorporating a frame having a center beam, a seat adjacent the rear of said frame, a collapsible body supporting structure above the chassis comprising a horizontal encircling frame spaced from the chassis, vertical stiffeners having pivot connections at opposite ends respectively to the encircling frame and the chassis, said structure including a flexible back rest secured at the upper edge thereof to the encircling frame and having a stiff free swinging bottom edge adapted to contact stops on the seat, diagonal stiffening braces between the upper and lower edges of said back rest, a forward stiffening element pivotally secured between the forward end of the frame and the chassis, and a collapsible wheel support comprising articulated members for front and rear wheels, collapsible supporting brackets respectively at opposite ends of the wheel support and connecting links between members of the wheel support on opposite sides thereof and extensions on adjacently positioned vertical stiffeners adapted to effect simultaneous shifting of the body supporting structure and the collapsible wheel support between collapsed and extended positions.

6. A collapsible wheeled vehicle comprising a chassis, a wheel support including extensible elements pivotally mounted at one end on the chassis and having the other ends adapted to swing freely, wheels on said other ends and means for locking said wheel carrying ends in extended positions comprising a bracket having opposite ends pivotally secured to the wheel carrying ends of the extensible elements and an intermediate portion adapted to lie adjacent the chassis, and a lock on the chassis comprising an S shaped strap having one end anchored to the chassis, a loop adjacent said end adapted to receive the bracket, a spring in a second loop of the strap and a lock pin extending transversely through the portions of the strap forming the loops and through the bracket, said pin being normally encircled by and engaging said spring and normally spring pressed into engagement with the bracket.

7. A collapsible wheeled vehicle and carrying case therefor comprising a chassis having an upper collapsible body supporting structure, a lower collapsible wheel supporting structure, a removable handle of substantially the length of the vehicle extending outwardly from the vehicle and a bag having a length substantially the same as that of the handle and of cross-sectional size sufficient to receive the vehicle when in collapsed condition, said bag having straps adapted to engage the handle for suspending the bag thereon when the handle is in use on the vehicle and adapted to secure the handle to the bag when said bag is packed with the vehicle.

CHARLES D. WILCOX.

REFERENCES CITED

The following references are of record in the file of this patent:

UNITED STATES PATENTS

| Number | Name | Date |
|---|---|---|
| 541,847 | Goss | July 2, 1895 |
| 1,040,602 | Adams | Oct. 8, 1912 |
| 1,140,085 | Turner | May 18, 1915 |
| 1,557,263 | Millen | Oct. 13, 1925 |
| 2,054,967 | Dahl | Sept. 22, 1936 |
| 2,208,252 | Feldman | July 16, 1940 |

FOREIGN PATENTS

| Number | Country | Date |
|---|---|---|
| 398,233 | Germany | July 5, 1924 |
| 618,223 | France | Mar. 5, 1927 |
| 648,644 | France | Dec. 12, 1928 |